United States Patent
Needham et al.

(10) Patent No.: US 7,512,486 B2
(45) Date of Patent: Mar. 31, 2009

(54) FUEL EFFICIENT NAVIGATION SYSTEM

(75) Inventors: Bradford H. Needham, North Plains, OR (US); Terrance J. Dishongh, Portland, OR (US); Kevin S. Rhodes, Lynnwood, WA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 11/171,878

(22) Filed: Jun. 29, 2005

(65) Prior Publication Data
US 2007/0005237 A1   Jan. 4, 2007

(51) Int. Cl.
*G01C 21/00* (2006.01)

(52) U.S. Cl. .................. 701/202; 340/989

(58) Field of Classification Search .............. 701/202, 701/104, 123, 209, 204, 213, 219, 300; 340/902, 340/989, 991
See application file for complete search history.

(56) References Cited

U.S. PATENT DOCUMENTS

| 5,724,944 | A | * | 3/1998 | Minowa et al. | 123/436 |
| 5,913,917 | A | * | 6/1999 | Murphy | 701/123 |
| 5,924,406 | A | * | 7/1999 | Kinugasa et al. | 123/436 |
| 6,240,364 | B1 | * | 5/2001 | Kerner et al. | 701/210 |
| 6,714,857 | B2 | * | 3/2004 | Kapolka et al. | 701/123 |
| 6,728,607 | B1 | * | 4/2004 | Anderson | 701/25 |

* cited by examiner

*Primary Examiner*—Dalena Tran
(74) *Attorney, Agent, or Firm*—Derek J. Reynolds (57) ABSTRACT

A method, device, and system are disclosed. In one embodiment, the method comprises acquiring vehicle fuel consumption information from a plurality of geographic locations, compiling the information to a map, and creating a low fuel consumption path between two locations on the map using the information.

18 Claims, 7 Drawing Sheets

Map Compilation/
Path Creation Device

FUEL EFFICIENT NAVIGATION SYSTEM

FIELD OF THE INVENTION

The invention relates to vehicle navigation systems. More specifically, the invention relates to vehicle navigation systems that utilize fuel efficiency as a parameter to determine directions between two locations.

BACKGROUND OF THE INVENTION

The rise in the cost of oil has created an ever-increasing burden on world economies. Many people must drive on a daily basis for school, work, and other commitments. To minimize the fuel cost impact, there has recently been an increasing trend to purchase cars with higher fuel efficiency such as electric/gas hybrids. Furthermore, many people who buy hybrid cars do so not only for fuel efficiency, but they are also concerned with the adverse environmental impact of cars with low fuel efficiency. Many studies link car emissions to the worldwide build up of greenhouse gases in the atmosphere.

One of the many technological advances that have benefited from the popularity explosion in the hybrid car market has been precision instantaneous mileage displays. To assist the driver in achieving higher mileage, the instantaneous mileage display will show the fuel consumption rate from moment to moment.

Global Positioning System (GPS) satellite navigation systems have recently been another area of technological advance in vehicles. GPS navigation systems show the location of the car from moment to moment. Such systems also can keep a record of where the car has traveled.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, device, and system for a fuel efficient navigation system are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
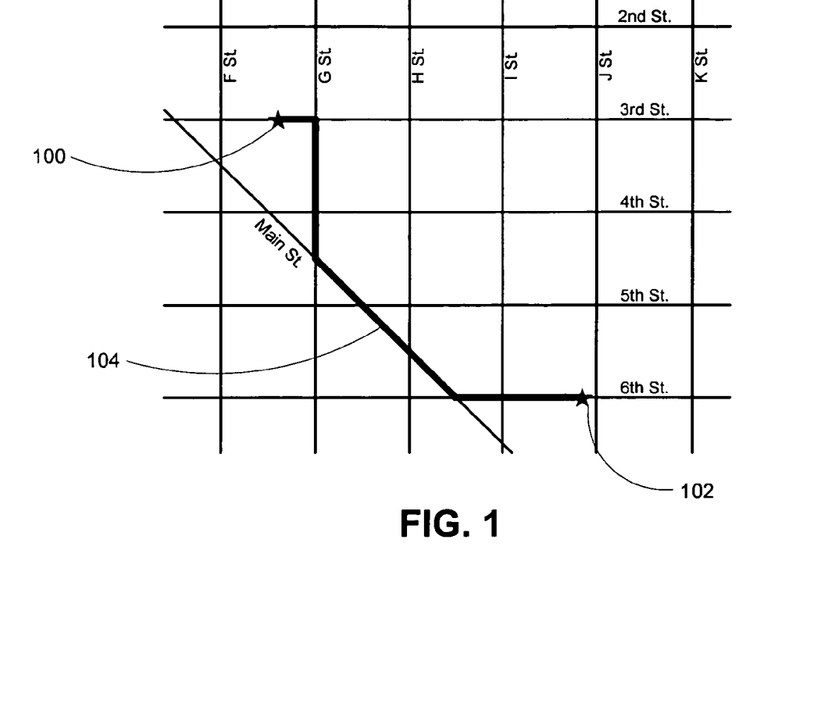
FIG. 1 illustrates one embodiment of a path between a starting point and a destination point on a street map.

FIG. 1 illustrates one embodiment of a path between a starting point and a destination point on a street map. Many mapping tools such as Mapquest (www.mapquest.com) will give a set of directions that allows a driver who is traveling from one point to another to navigate effectively through many streets to reach his destination. One goal of a mapping tool that calculates directions is to get between the start and destination as fast and conveniently as possible. Currently, mapping tools do not associate gas mileage as a factor in the creation of a set of directions. Thus, if a driver wanted to get directions from the starting point 100 to the destination point 102, the mapping tool most likely would designate a path that minimized the number of miles driven, or minimize the number of turns needed, or a combination of both. An example of these directions might be path 104. Path 104 is a lowest distance driven path between starting point 100 and destination point 102.

Figure 2:
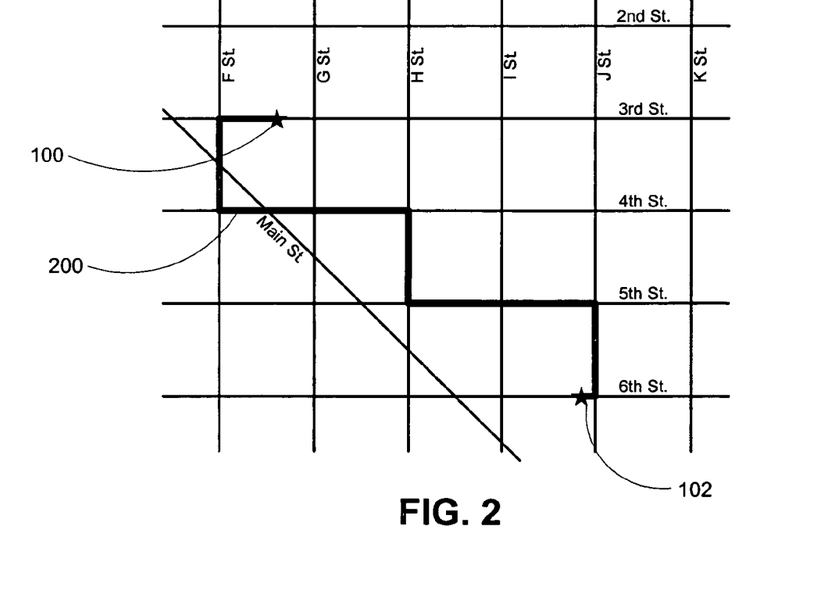
FIG. 2 illustrates another embodiment of a path between a starting point and a destination point on the same map that may allow the lowest amount of gas consumed between the two points.

One disadvantage of this approach is that the path with the smallest distance driven is not necessarily the highest potential gas mileage path. For instance, there might be heavy traffic on Main St. (path 104 as shown in FIG. 1). The heavy traffic may cause the driver to sit idle in the car for a greater length of time. This detrimental idle time may in turn lower the overall gas mileage efficiency (i.e., fuel consumption) for this path. FIG. 1 therefore shows a path with the lowest distance driven between the two points, whereas FIG. 2 illustrates another embodiment of a path between a starting point and a destination point on the same map that may allow the lowest amount of gas consumed between the two points. For example, because Main St. has the heaviest traffic in the above example embodiment, a more round about route that takes advantage of less traveled surface streets can minimize the idle time sitting in traffic. Thus, although path 200 has a longer distance between the starting point 100 and destination point 102, this path can potentially minimize the total gas consumed between the two points.

It is important to distinguish between miles per gallon efficiency and lowest overall gas consumed. While it is always important to have high miles per gallon while driving, if a driver takes the path created by taking streets with the highest miles per gallon average and that path increases the distance traveled significantly, the increased distance may offset the decrease in fuel consumption per mile and result in a less than optimal path. Rather, the best path for overall gas mileage efficiency is the path that gets the driver from the starting point to the destination point using the least amount of gas. A determination must be made to balance miles per gallon with distance traveled to achieve the least amount of gas used.

Figure 3:
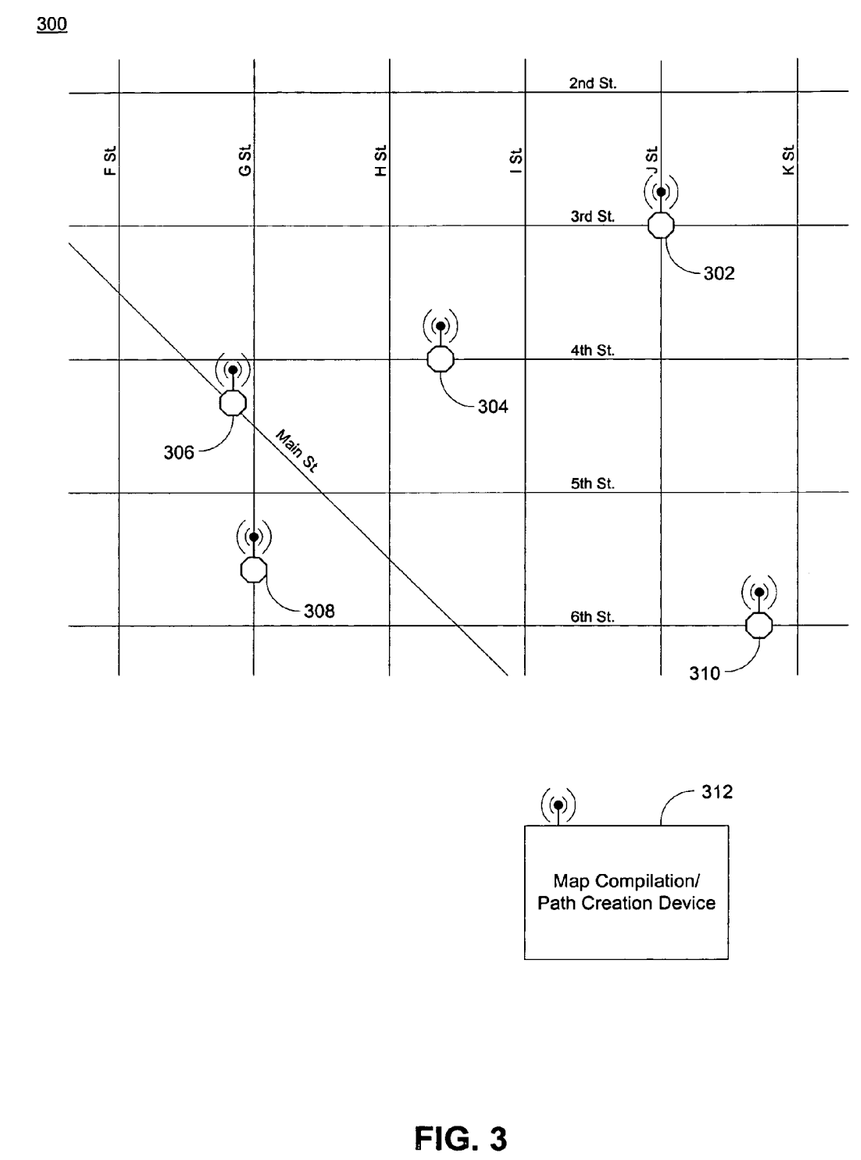
FIG. 3 describes one embodiment of a fuel efficiency acquisition and navigation system that includes acquisition devices and a fuel efficiency map compilation and path creation device.

FIG. 3 describes one embodiment of a fuel efficiency acquisition and navigation system that includes acquisition devices and a fuel efficiency map compilation and path creation device. In one embodiment, map 300 displays multiple vehicles (302, 304, 306, 308, and 310) that are each equipped with a dynamic fuel efficiency acquisition device. The acquisition devices have the ability to report instantaneous fuel efficiency from the vehicle over a wireless network. In different embodiments, the wireless network may transmit information with one of many protocols such as Global System for Mobile Communications (GSM), Code Division Multiple Access (CDMA), or WiMax, among others. In one embodiment, each acquisition device has global positioning system (GPS) capabilities or comparable location determination capabilities. In this embodiment, each acquisition device takes fuel efficiency readings at multiple locations on a map and reports the instantaneous fuel efficiency information and the specific location determined by a GPS device (or other location determination device) where the fuel efficiency information was measured.

In one embodiment, each device reports the fuel efficiency and location information over a wireless network to a map compilation/path creation device 312. The device's map compilation function associates specific locations on a map to particular fuel efficiency data. Thus, once a fuel efficiency map is compiled, each location on the map is associated with a particular fuel consumption rate. Next, the device's path creation function takes the compiled fuel efficiency map and calculates the lowest fuel consumption path between any two points on the map. The map compilation and path creation functions are examined in more detail in FIGS. 5-7.

In another embodiment, each acquisition device saves its location and fuel efficiency information during the course of a trip in the vehicle. Then, when the vehicle returns to a certain location (e.g., the driver's home), the device transmits its saved location and fuel efficiency information through a wired or local wireless connection to a separate, non-mobile computer at this location. In one embodiment, the non-mobile computer has the map compilation/path creation device 312 residing in it. In another embodiment, the non-mobile computer then transmits the location and fuel efficiency information to a centralized computer, such as a server, that includes the map compilation/path creation device 312.

Figure 4:
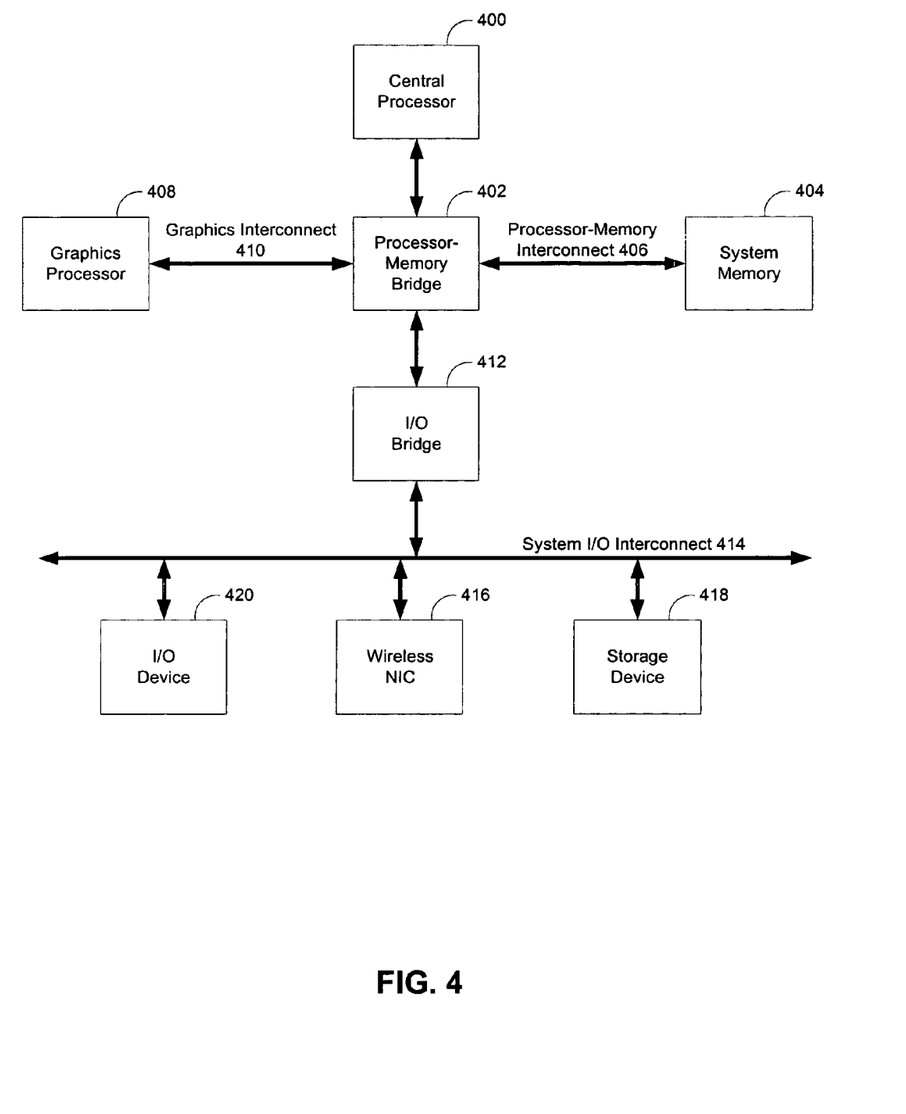
FIG. 4 is a block diagram of a computer system which may be used as a fuel efficiency map compilation device and path creation device in one embodiment.

FIG. 4 is a block diagram of a computer system which may be used as a fuel efficiency map compilation device and path creation device in one embodiment. The computer system comprises a processor-memory interconnect 400 for communication between different agents coupled to interconnect 400, such as processors, bridges, memory devices, etc. In one embodiment, central processor 402 is coupled to processor-memory interconnect 400 through processor-memory bridge 404. In another embodiment, there are multiple central processors coupled to processor-memory interconnect (multiple processors are not shown in this figure).

Processor-memory interconnect 400 provides the central processor 402 and other devices access to the memory subsystem. In one embodiment, a system memory controller that controls access to system memory 406 is located on the same chip as processor-memory bridge 404. In another embodiment, a system memory controller is located on the same chip as central processor 402. Information, instructions, and other data may be stored in system memory 406 for use by central processor 402 as well as many other potential devices. In one embodiment, a graphics processor 408 is coupled to processor-memory bridge 404 through a graphics interconnect 410.

I/O devices are coupled to system I/O interconnect 410 and to processor-memory interconnect 400 through I/O bridge 412 and processor-memory bridge 404. I/O Bridge 412 is coupled to processor-memory interconnect 400 (through processor-memory bridge 404) and system I/O interconnect 414 to provide an interface for a device on one interconnect to communicate with a device on the other interconnect. In one embodiment, a storage device 418 (such as a hard disk drive) and a wireless network interface card (NIC) 416 (to connect to a wireless network) are connected to system I/O interconnect 410. In different embodiments, there may be more I/O devices connected to system I/O interconnect 410, such as I/O device 420. In one embodiment, I/O device 420 is a wired NIC to allow the computer system access to a wired network in addition to the wireless network mentioned above.

In one embodiment, the wireless NIC 416 receives the fuel efficiency and location information reports from the acquisition devices. The central processor 402 compiles the map and creates lowest fuel consumption paths by executing code in system memory 406 designed to complete these functions. In one embodiment, the central processor 402 compiles the fuel efficiency map in system memory 406 with the data received from the acquisition devices. The central processor 402 may also store the compiled map in storage device 418 for extended periods of time. When a request comes in to find the lowest fuel consumption between two points on the map, the central processor 402 creates the path by calculating the lowest fuel consumption path using the map data in system memory 406. The central processor 402 then can send the resulting path to the requester through one or more NIC devices.

In the above embodiment, the map compilation/path creation device is a single device that compiles and stores the map and also creates the lowest fuel consumption path between any two points on the map. Alternatively, in another embodiment, the map compilation function and path creation function are executed on separate devices. In this embodiment, a separate map compilation device is connected to the wireless network. The map compilation device accepts input information from the acquisition devices and then compiles and stores the fuel efficiency map. Additionally, in this embodiment, a path creation device is a separate device that is connected to the map compilation device through the wireless network. The path creation device accesses the map through the network and creates a lowest fuel consumption path using the map data.

The starting point and destination point information that the path creation device requires to create the path is received through a request over either the wireless network or a wired network additionally connected to the path creation device. In different embodiments, the request may be by a driver who is operating a vehicle that has an acquisition device or a vehicle that does not have an acquisition device but has a different device that is able to access the wireless network. Furthermore, drivers who are planning their trips from their home, work, or on another computer could send requests from any location whether or not they are currently operating a vehicle.

In another embodiment, each acquisition device has its own map compilation/path creation device and all the acquisition devices communicate with each other over the wireless network in a distributed environment. In this embodiment, no central map compilation device/path creation device is needed. Rather, each vehicle operates independently with the entire functionality to acquire data, compile the map, and create the path. In this embodiment, allowing the vehicles to share acquisition data with each other allows for a more efficient fuel efficiency system, but it is not necessary for the invention to be effective for a given vehicle once that vehicle has driven around a large portion of the map over time and collected a large portion of its own data to complete the map.

Figure 5:
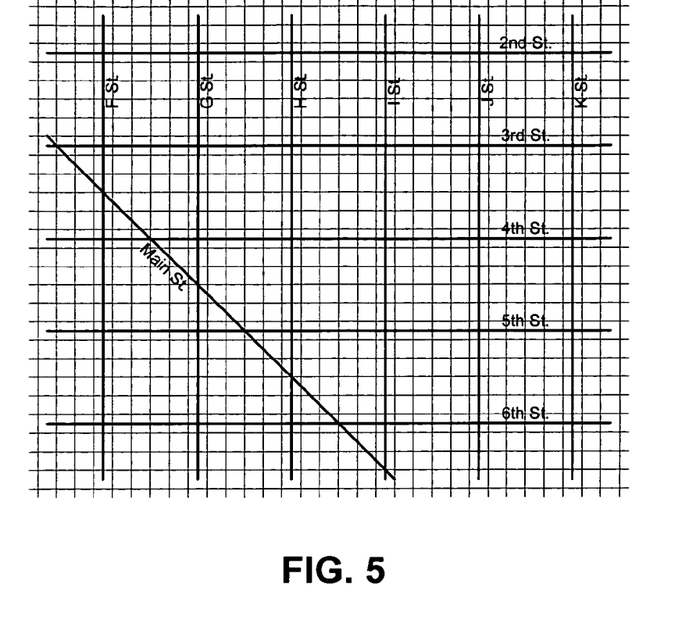
FIG. 5 describes one embodiment of a compiled fuel efficiency map with a grid system.

There are multiple ways in which it is possible to compile the fuel efficiency map. FIG. 5 illustrates one embodiment of a compiled fuel efficiency map with a grid system. In this embodiment, the map is divided into a grid. The grid is made up of many small individual areas of land. Each area has a fuel efficiency rating associated with it along with location information. The location information can be acquired using a GPS device or other location acquisition device. The fuel efficiency information is acquired from a vehicle that has driven through the particular area's location. The granularity of the grid (i.e., the size of each area) can vary greatly. The smaller the granularity, the more accurate the fuel efficiency data is for each area's location. On the other hand, a smaller granularity increases the map's complexity and storage requirements. The minimum granularity size per location is limited only by the accuracy of the GPS device. Alternatively, the larger the granularity of the grid, the less accurate the fuel efficiency data is per location.

The map can be stored in the map compilation device's memory in the form of a data table. The data table would couple each location with fuel efficiency data. More specifically, in one embodiment, a particular entry in the table would have a precise latitude and longitude location coupled to a miles per gallon measurement.

In one embodiment, as multiple acquisition devices report data at the particular location, the miles per gallon measurement is averaged. In another embodiment, the acquisition device could additionally report the make and model of the vehicle that is reporting the data and add that information to the table at that particular location. Thus, similar vehicles to the vehicle requesting the path could be weighted more heavily. For example, this additional data would be useful to distinguish hybrid vehicles from traditional combustion engine vehicles considering hybrids get better gas mileage in city driving than highway driving and the reverse is true for traditional combustion engine cars.

In one embodiment, the direction the acquisition vehicle is traveling also may be stored in the data table. In the morning, the commute into the city on a certain highway may involve heavy traffic, whereas in the afternoon, the commute out of the city on the same highway may involve similar heavy traffic. A vehicle traveling in the opposite direction as the commute would be on the same road, but would not be experiencing the same traffic patterns as a vehicle in the commute traffic.

Figure 6:
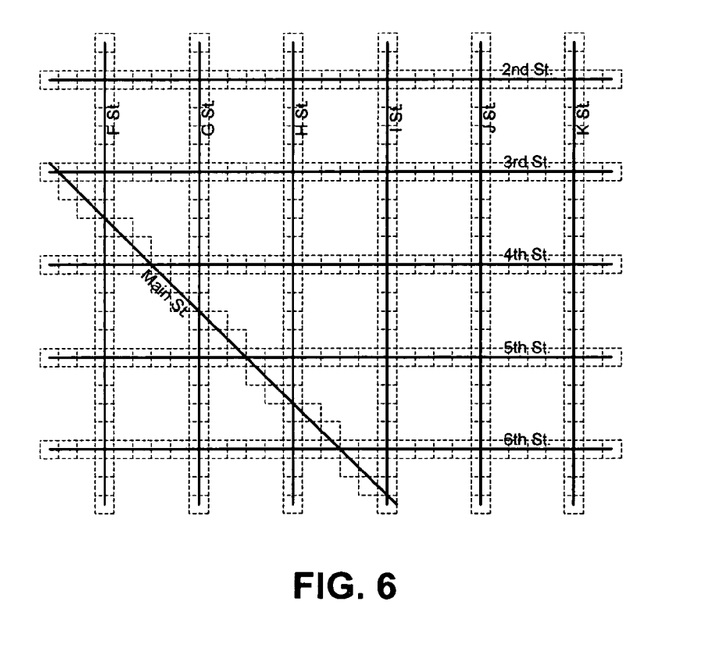
FIG. 6 illustrates a different embodiment of a compiled fuel efficiency map with a grid system.

FIG. 6 illustrates a different embodiment of a compiled fuel efficiency map with a grid system. In this embodiment, the map is again divided into a grid only this time the grid only is compiled over locations that correspond to streets and highways in which a vehicle can effectively travel on. This embodiment may maintain the same accuracy as the map in FIG. 5 but decreases the storage space required for the data table since a majority of land does not have roads on which cars can drive.

Figure 7:
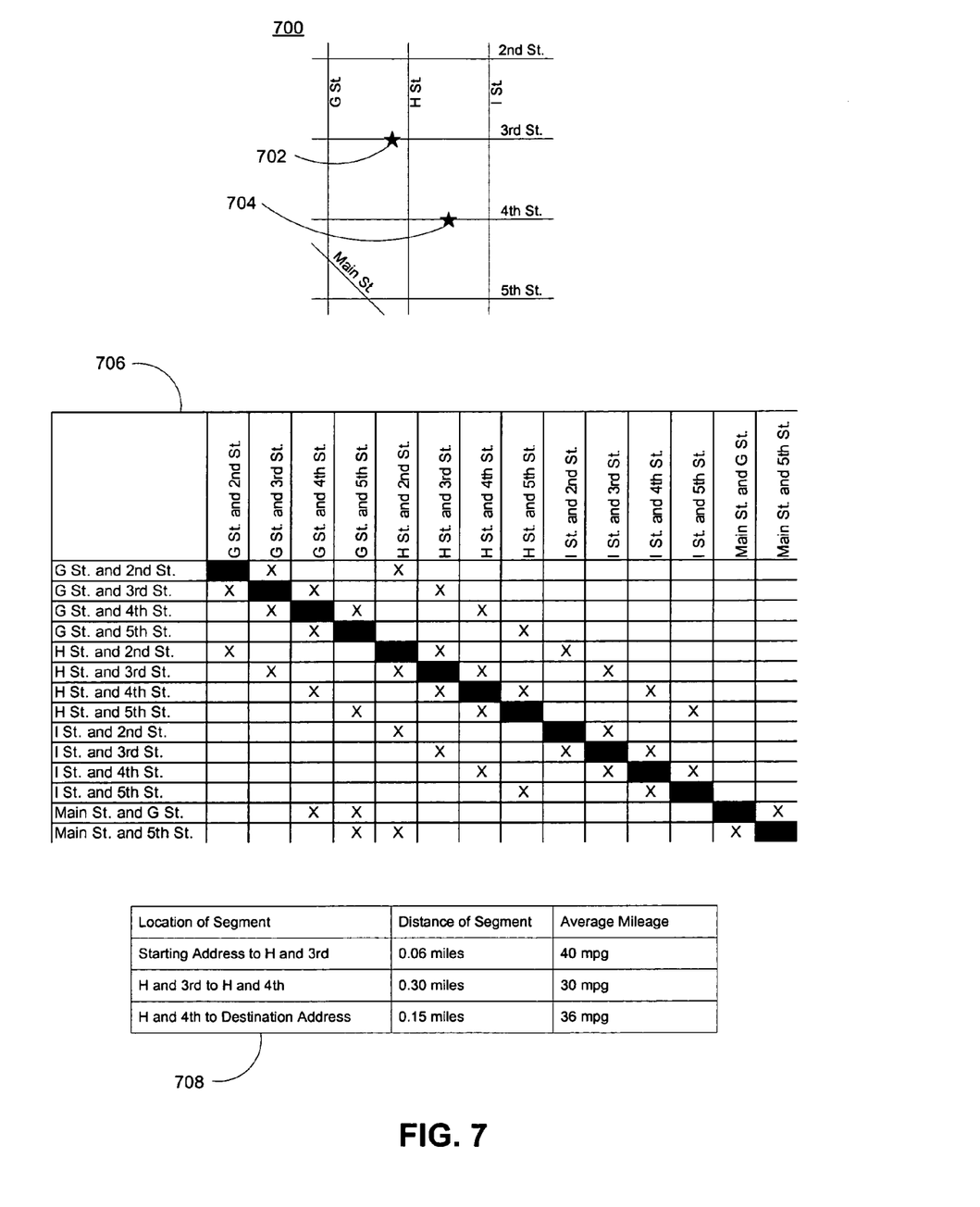
FIG. 7 illustrates another embodiment of a compiled fuel efficiency map.

FIG. 7 illustrates another embodiment of a compiled fuel efficiency map. In this embodiment, the grid system of FIGS. 5 and 6 is replaced with an intersection system. The intersection system allows a fuel efficiency reading from one intersection to an adjacent intersection. In this embodiment, the fuel efficiency map may be stored in memory as data table 706. Data table 706 permits a lookup of an intersection located in a particular row in the table. The particular intersection, as displayed in the corresponding row in data table 706, has an X in every cell that is a corresponding adjacent intersection. The fuel consumption information is stored in place of the X. For example, to obtain the fuel consumption information that pertains to traveling from the intersection of G St. and 3rd St. to the intersection of G St. and 2nd St., locate the row corresponding to G St. and 3rd St. and find the corresponding X located in the G St. and 2nd St. column. The fuel consumption information would be stored in place of that particular X.

In one example embodiment, the stored data table 706 is used as a reference for a driver who wants to get from starting point 702 to destination point 704. One possible created path for the driver to use is described in the set of directions 708. Each segment of the path created using directions 708 is between two adjacent intersections or between the starting point or destination point and an adjacent intersection. To calculate the total fuel consumed, each segment, which corresponds to a particular row and column cell in data table 706, has information regarding the distance of the segment and the average miles per gallon of the segment. The first segment in directions 708 is from the starting point to the intersection of H St. and 3rd St. The starting point represents an address on 3rd St. on the map 700. The calculation of the fuel consumption for the first segment would entail determining the distance from the address to the adjacent intersection of H St. and 3rd St. That particular distance can be found using existing mapping software or other means such as getting GPS locations of the two endpoints of the segment. The average miles per gallon information can be determined by just using the same miles per gallon information that is available in data table 706 for the segment from the intersection of G St. and 3rd St. to the intersection of H St. and 3rd St.

The second segment in directions 708 is from the intersection of H St. and 3rd St. to H St. and 4th St. This particular segment information would be readily available in data table 706. The third segment in directions 708 is from the intersection of H St. and 4th St. to the destination point. The destination point represents an address on 4th St on the map 700. This segment's information would be obtainable in the same fashion as the first segment information (as discussed above). Thus, a path has been created using the set of directions 708. Many more paths between the starting point 702 and the destination point 704 can be created and one may possibly have a lower total fuel consumption than the path created by the set of directions 708.

In another embodiment, the compiled fuel efficiency maps in FIGS. 5-7 add the additional variables of "time" and "date" when storing the information in the underlying data tables. Time and date information are extremely important when creating the lowest fuel consumption path on a map. Traffic patterns are largely relative to the time of the day and the day of the week due to weekday commute traffic, weekend vacation traffic, sporting events, and many other variables.

In one embodiment, the compiled fuel efficiency intersection map is modified to include overlapping segments. For example, in this embodiment, the map may include a segment from G St. and 3rd St. to G St. and 5th St as well as the segments G St. and 3rd St. to G St. and 4th St along with G St. and 4th St. to G and 5th. The overlapping segments are beneficial when there is no need to stop at a stoplight versus when there is a need to stop. Stops and turns may reduce mileage, thus if none are needed for several intersections that creates different mileage readings than when multiple stops and turns are needed.

Figure 8:
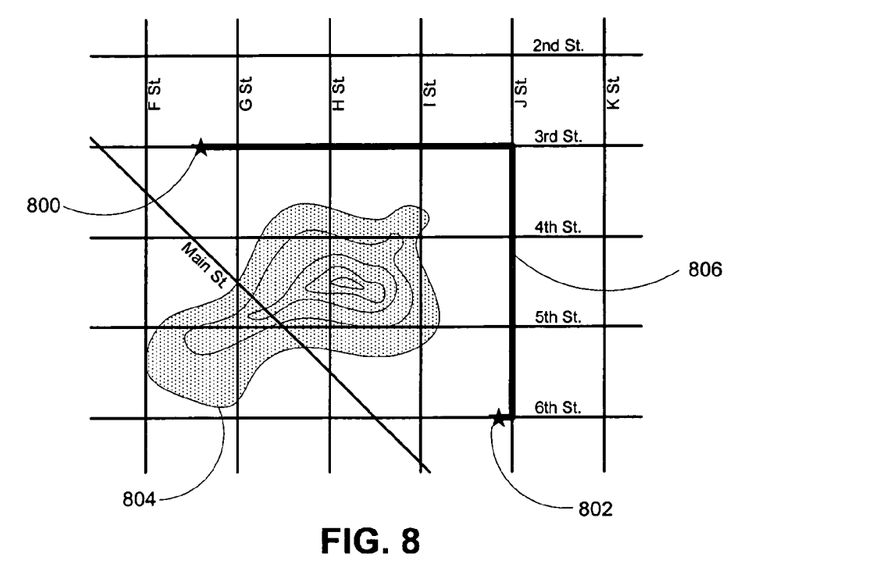
FIG. 8 illustrates one embodiment of a topographical prediction function.

No matter how many acquisition vehicles are utilized to fill in the data table for fuel efficiency, there is the potential that there is missing data for the maps in FIGS. 5-7. Thus, there are additional prediction functions that may be added to the path creation routine. FIG. 8 illustrates one embodiment of a topographical prediction function. In this embodiment, the map is not complete with segment by segment (or grid location by grid location) average fuel consumption information. One way in which a rough prediction may be made in terms of fuel consumption is to overlay a topographical map on the incomplete fuel efficiency map. Generally, steep hills are notorious for lowering fuel efficiency. Thus, if a driver wanted to get from starting point 800 to destination point 802 and the path creation routine was aware of a large hill 804 in the way of a more direct route between the two points, the path created 806 would navigate around the hill to keep the vehicle on as flat of ground as possible.

Figure 9:
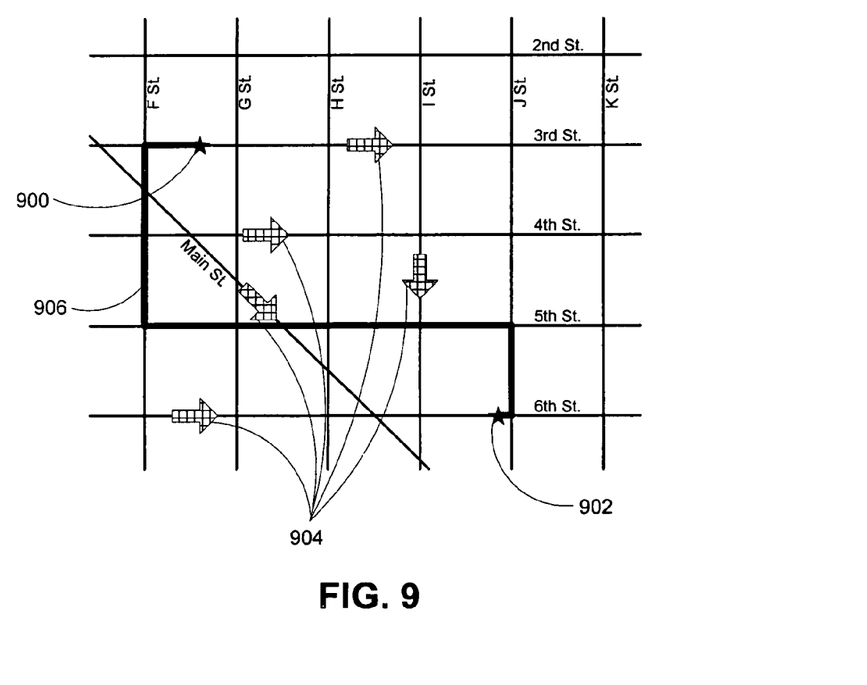
FIG. 9 illustrates one embodiment of a traffic pattern prediction function.

FIG. 9 illustrates one embodiment of a traffic pattern prediction function. In this embodiment, the map again is not complete with segment by segment (or grid location by grid location) average fuel consumption information. Another way in which a rough prediction may be made in terms of fuel consumption is to gather input from regional department of transportation traffic reports. Thus, if a driver wanted to get from starting point 900 to destination point 902 and the path creation routine was aware of bad traffic at multiple points 904 on the map, the path created 906 would navigate around the reported bad traffic to keep the vehicle in as little traffic as possible. In another embodiment, the traffic pattern prediction routine could override an otherwise completely compiled map since the traffic data is real-time while the compiled fuel efficiency map is comparatively dated.

Figure 10:
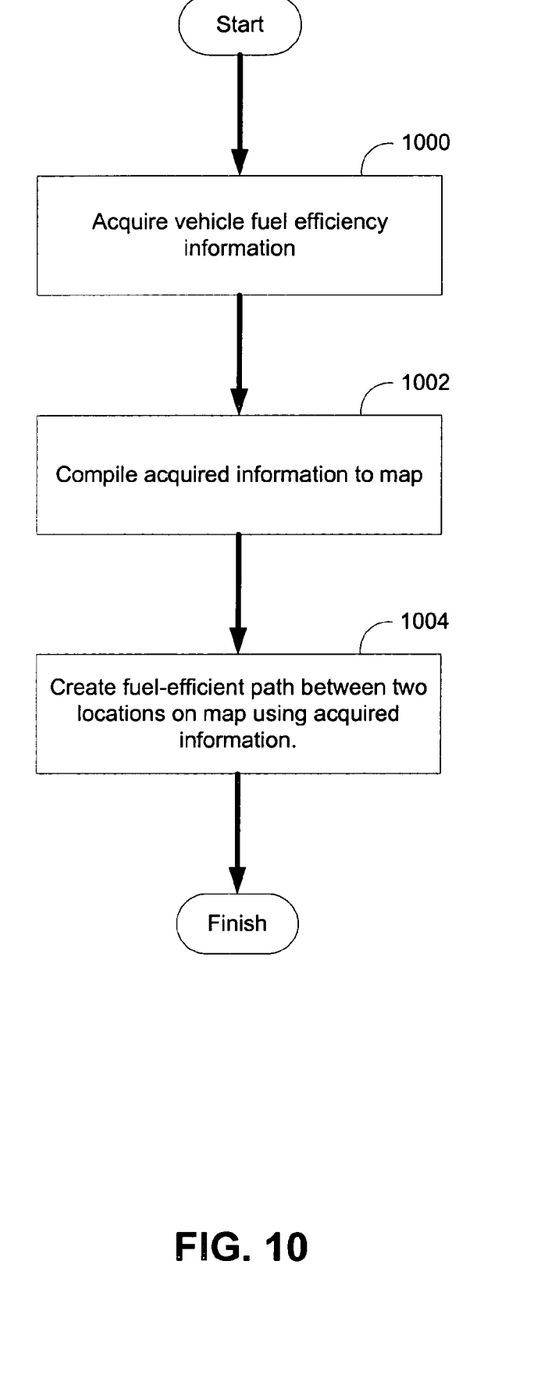
FIG. 10 is a flow diagram of a method for creating a fuel efficient path between two points on a map.

FIG. 10 is a flow diagram of a method for creating a fuel efficient path between two points on a map. The method is performed by processing logic that may comprise hardware (circuitry, dedicated logic, etc.), software (such as is run on a general purpose computer system or a dedicated machine), or a combination of both. Referring to FIG. 10, the method begins with processing logic acquiring vehicle fuel efficiency information (processing block 1000). Next, processing logic compiles the acquired information to a map (processing block 1002). Finally, processing logic creates a fuel-efficient path between two locations on the map using the acquired information (processing block 1004) and the process is finished.

Thus, embodiments of a method, device, and system for a fuel efficient navigation system are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
acquiring vehicle fuel consumption information dynamically from a plurality of vehicles between a plurality of pairs of adjacent intersections;
supplementing the vehicle fuel consumption information with additional environment data to approximate fuel consumption of one or more other vehicles;
dynamically compiling the information to a map;
creating a low fuel consumption path between a beginning intersection and an ending intersection on the map using the information, upon a request from at least one of the plurality of vehicles for the low fuel consumption path between the beginning intersection and the ending intersection; and
sending the created low fuel consumption path dynamically to the requesting vehicle.

2. The method of claim 1, further comprising acquiring current date and time information with each acquired piece of vehicle fuel consumption information.

3. The method of claim 2, wherein creating a low fuel-consumption path between the beginning intersection and the ending intersection further comprises creating the path of substantially the lowest fuel consumption between the beginning intersection and the ending intersection among a finite set of available paths.

4. The method of claim 1, wherein the additional environment data comprises topographic map.

5. The method of claim 1, wherein the additional environment data comprises known traffic flow information.

6. A device, comprising:
an acquisition unit to acquire vehicle fuel consumption information dynamically from a plurality of vehicles between a plurality of pairs of adjacent intersections;
a map compilation unit to dynamically compile the information to a map; and
a path creation unit to
supplement the vehicle fuel consumption information with additional environment data to approximate fuel consumption of one or more other vehicles;
create a low fuel consumption path between a beginning intersection and an ending intersection on the map using the information, upon a request from at least one of the plurality of vehicles for the low fuel consumption path between the beginning intersection and the ending intersection; and
send the created low fuel consumption path dynamically to the requesting vehicle.

7. The device of claim 6, further operable to acquire current date and time information with each acquired piece of vehicle fuel consumption information.

8. The device of claim 7, wherein the path creation unit is further operable to create the path of lowest fuel consumption between the beginning intersection and the ending intersection among a finite set of available paths.

9. The device of claim 6, wherein the additional environment data comprises topographic map information.

10. The device of claim 6, wherein the additional environment data comprises known traffic flow information.

11. A system, comprising:
a wireless network;
a plurality of acquisition devices, each acquisition device located within one of a plurality of vehicles, the plurality of acquisition devices coupled to the wireless network, to acquire vehicle fuel consumption information between a plurality of pairs of adjacent intersections;
a map compilation device, coupled to the wireless network, to dynamically compile the information to a map; and
a path creation device, coupled to the wireless network, to
supplement the vehicle fuel consumption information with additional environment data to approximate fuel consumption of one or more vehicles; and
create a low fuel consumption path between a beginning intersection and an ending intersection on the map using the information, upon a request from at least one of the plurality of vehicles for the low fuel consumption path between the beginning intersection and the ending intersection; and
send the created low fuel consumption path dynamically to the requesting vehicle.

12. The system of claim 11, wherein each acquisition device is located in a separate vehicle.

13. The system of claim 12, further comprising each acquisition device sending the acquired information over the wireless network to the map compilation device.

14. The system of claim 13, further comprising a plurality of path management devices, coupled to the wireless network, operable to receive the created low fuel consumption path and to assist one or more vehicles navigate the created path.

15. The system of claim 14, wherein each acquisition device is further operable to acquire current date and time information with each acquired piece of vehicle fuel consumption information.

16. The system of claim 15, wherein the path creation device is further operable to create the path of lowest fuel consumption between the beginning intersection and the ending intersection among a finite set of available paths.

17. The system of claim 11, wherein the additional environment data comprises topographic map information.

18. The system of claim 11, wherein the additional environment data comprises known traffic flow information.

* * * * *